(12) United States Patent
Menzel

(10) Patent No.: US 6,504,837 B1
(45) Date of Patent: Jan. 7, 2003

(54) METHOD AND SYSTEM FOR DATA TRANSMISSION WITH A MACRODIVERSITY RECEPTION

(75) Inventor: Christian Menzel, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/465,281

(22) Filed: Dec. 16, 1999

(30) Foreign Application Priority Data

Dec. 16, 1998 (DE) .......................................... 198 58 113

(51) Int. Cl.[7] .............................................. H04L 12/28
(52) U.S. Cl. ...................... 370/351; 370/337; 370/347; 455/524; 455/525; 455/132; 455/133
(58) Field of Search ................................. 370/328, 331, 370/334, 329, 336, 337, 345, 347, 442, 351, 350; 455/130, 132, 133, 134, 135, 137, 524, 525

(56) References Cited

U.S. PATENT DOCUMENTS

| | | | | |
|---|---|---|---|---|
| 5,539,749 A | * | 7/1996 | Eul | 370/331 |
| 5,594,738 A | * | 1/1997 | Crisler et al. | 370/347 |
| 5,689,502 A | * | 11/1997 | Scott | 370/281 |
| 5,734,967 A | * | 3/1998 | Kotzin et al. | 370/252 |
| 5,745,484 A | * | 4/1998 | Scott | 370/347 |
| 5,828,659 A | * | 10/1998 | Teder et al. | 370/328 |
| 6,084,886 A | * | 7/2000 | Dehner et al. | 370/210 |
| 6,311,074 B1 | * | 10/2001 | Luders | 455/525 |
| 6,351,651 B1 | * | 2/2002 | Hamabe et al. | 455/522 |

FOREIGN PATENT DOCUMENTS

| | | |
|---|---|---|
| DE | 198 20 736 C1 | 9/1999 |
| EP | 0 830 043 A1 | 3/1998 |

* cited by examiner

Primary Examiner—Nay Maung
Assistant Examiner—Sonny Trinh
(74) Attorney, Agent, or Firm—Laurence A. Greenberg; Werner H. Stemer; Ralph E. Locher

(57) ABSTRACT

In a method for transmitting data via a radio interface between base stations and subscriber stations in a radio communications system, the time slots in a frame are allocated to different base stations such that the base stations transmit exclusively in the time slots in the downlink direction which are allocated to them, but also receive in those time slots in the uplink direction which are not allocated to them. It is thus possible to combine the received signals from at least two base stations with one another. Without any significant additional complexity, the existing base stations, which are on standby during some time slots, can be used to provide a macrodiversity reception. The transmission quality is improved by the plurality of propagation paths which are evaluated in the uplink direction. A radio communications system is also provided.

12 Claims, 5 Drawing Sheets

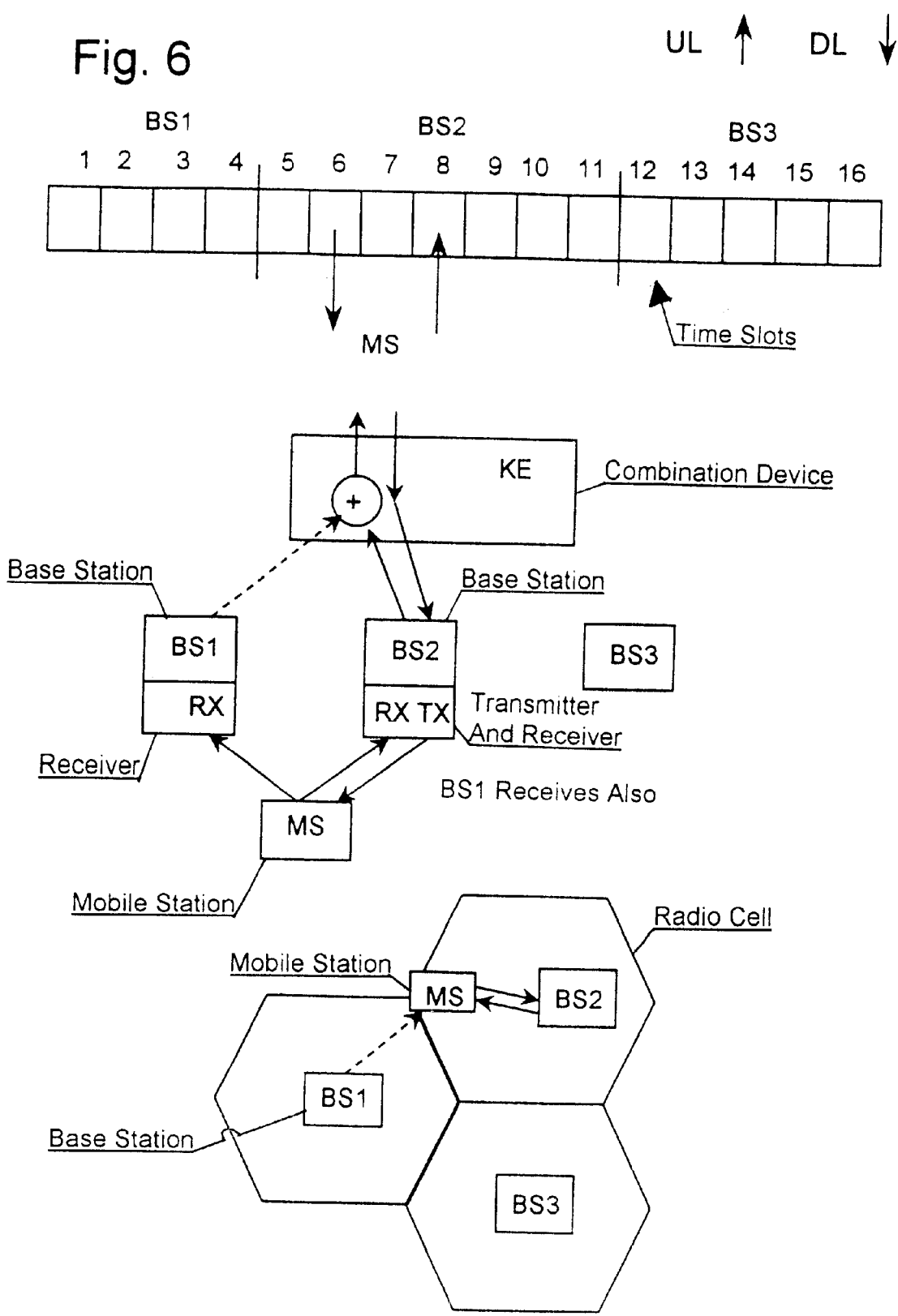

METHOD AND SYSTEM FOR DATA TRANSMISSION WITH A MACRODIVERSITY RECEPTION

BACKGROUND OF THE INVENTION

Field of the Invention

The invention relates to a method for data transmission via a radio interface and a radio communications system, which allow a macrodiversity reception.

In radio communications systems, information (for example voice, video information or other data) is transmitted via a radio interface using electromagnetic waves. The radio interface relates to a connection between a base station and subscriber stations. The subscriber stations may be mobile stations or stationary radio stations. The electromagnetic waves are in this case radiated at carrier frequencies which are in the frequency band intended for the respective system. Frequencies in the frequency band around about 2000 MHz are intended for future radio communications systems, for example UMTS (Universal Mobile Telecommunication System), or other 3rd generation systems.

Two modes are intended for 3rd generation systems. In a TDD (time division duplex) mode, the uplink direction (uplink being the direction from the mobile station to the base station) can be distinguished by different time slots within a frequency band. In an FDD (frequency division duplex) mode, there is one frequency band for the uplink direction, and one frequency bank for the downlink direction. Only the TDD mode will be described in the following text.

A radio communications system using the TDD mode is described, for example, in the German patent document DE 198 20 736, in which case the time slots in a frame are assigned or allocated to different base stations. These time slots are each used exclusively for transmission or reception by the base stations.

In the handover or transition region between two radio cells or sectors which are covered or serviced by different base stations, the transmission quality is normally subject to deterioration.

SUMMARY OF THE INVENTION

It is accordingly an object of the invention to provide a method and a system for transmitting data which overcome the above-mentioned disadvantages of the heretofore-known methods and systems of this general type and which improve the transmission quality of a data transmission via a radio interface.

With the foregoing and other objects in view there is provided, in accordance with the invention, a method for transmitting data via a radio interface between base stations and subscriber stations in a radio communications system. The method includes the steps of using a time-division multiplex process for organizing a radio interface within a frequency band such that a plurality of time slots constitute a frame; selectively using the time slots in one of an uplink direction and a downlink direction; allocating respective time slots of the plurality of time slots in the frame to respective base stations; transmitting, with the respective base stations, using exclusively the respective time slots allocated to the respective base stations for the downlink direction; receiving, with the respective base stations, in the respective time slots allocated to the respective base stations for the uplink direction as well as in further ones of the time slots not allocated to the respective base stations for the uplink direction; and combining received signals from at least two of the base stations for a macrodiversity reception.

In accordance with another mode of the invention, monitoring procedures are used in the base stations for determining time slots in the uplink direction not allocated to the respective base stations.

In accordance with yet another mode of the invention, a central unit reports to the respective base stations which of the time slots are not allocated to the respective base stations in the uplink direction.

In accordance with a further mode of the invention, the base stations report to each other the time slots in the uplink direction which are not allocated to the base stations.

In accordance with yet a further mode of the invention, the base stations for the different sector cells are installed at one location or, alternatively, are installed at different locations.

With the objects of the invention in view there is also provided, a radio communications system, including a first base station and a second base station, the first and second base stations having a radio interface for transmitting data in a downlink direction and for receiving data in an uplink direction; a radio resource controller connected to the first and second base stations for allocating radio resources and organizing the radio interface within a frequency band in accordance with a time-division multiplex scheme such that a plurality of time slots constitute a frame, each of the time slots being exclusively used in one of the uplink direction and the downlink direction; the first base station having a transmitter transmitting in a given one of the time slots allocated to the first base station for the downlink direction; the first base station having a first receiver for receiving in a further one of the time slots allocated to the first base station for the uplink direction; the second base station having a second receiver receiving in another one of the time slot allocated to the second base station for the uplink direction and receiving in additional ones of the time slots not allocated to the second base station for the uplink direction; and a combination device connected to the first and second base stations and combining received signals from the first and second base stations for a macrodiversity reception.

It is understood that the allocation of the time slots may change over time and that the transmitter may be allocated not just a single given time slot of a frame for transmitting but may be allocated a number of given time slots in a frame.

In accordance with another feature of the invention, the first receiver also receives in time slots not allocated to the first base station for the uplink direction.

In accordance with yet another feature of the invention, a subscriber station receives in the given one of the time slots allocated to the first base station for the downlink direction and transmits in the further one of the time slots allocated to the first base station for the uplink direction.

According to the invention, the time slots in a frame are allocated to different base stations in a radio communications system using the TDD mode. In the downlink direction, the base stations transmit exclusively in the time slots which are allocated to them, however, in the uplink direction, the base stations also receive in those time slots which are not allocated to them. It is thus possible to combine the received signals from at least two base stations with one another. The combination applies only to one transmission direction, the uplink direction.

The existing base stations, which are on standby during some time slots, can be used to provide a macrodiversity reception without any significant additional complexity. The transmission quality is improved by the plurality of propagation paths which are evaluated in the uplink direction.

The reception reliability is improved in boundary regions of radio cells, particularly in the case of sector cells, since the signals from at least two base stations can be received and the signals, which may be subject to interference, can be optimally combined. In the uplink direction, the method improves the power balance or transmission budget for a connection, such that the subscriber station can be operated even with a low transmission power and in poor transmission conditions, thus allowing longer call times and standby times.

The macrodiversity reception method improves the utilization of the hardware installed in a base station. This improved hardware utilization in the receiving device is in general, when considering an entire TDMA frame, independent of the number of time slots per frame allocated to a base station.

According to an advantageous embodiment of the invention, each base station uses a monitoring procedure and determines the time slots in the uplink direction which are not allocated to it. The monitoring procedure can distinguish between the time slots which are used in the uplink or downlink directions, on the basis of an evaluation of the received signals (Doppler shift, information content and information structure). According to this embodiment of the invention, no additional signaling complexity is required. Alternatively, it is possible for a central unit to report to the base stations not only the time slots in the uplink direction which are allocated to them but also the time slots in the uplink direction which are not allocated to them. This may be done within the allocation signaling or assignment signaling which, in the extreme case, would actually also have to include the allocation or assignment of all the time slots to one base station. A further embodiment of the invention provides that the base stations report to each other the time slots in the uplink direction which are allocated to them. For example, an evaluation of signaling channels of the radio interface of other base stations may in this case allow further information relating to the data transmission, such as the type of data transmission, to be additionally reported.

It is within the scope of the invention for the base stations for sector cells to be installed at one location or at different locations. The combination of the received signals is thus carried out either already within a base station complex at one location or in a central facility, which connects a plurality of base stations.

In particular, the invention can be used advantageously if the frequency band has a broad band width and signals which are transmitted at the same time within the frequency band differ on the basis of a connection-specific spread code. A large number of connections can be transmitted within one broad band frequency band, so that the diversity gain in this case can be used jointly for a number of connections, in the extreme case for all of them.

The combination of the received signals may be carried out within the physical layer through the use of an MRC combination (maximum ratio combination) or, in higher layers, by a selective combination.

Other features which are considered as characteristic for the invention are set forth in the appended claims.

Although the invention is illustrated and described herein as embodied in a method and a system for data transmission with a macrodiversity reception, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5 and 6 are schematics illustrations of the macrodiversity reception method according to the invention.

DESCRIPTION OF THE PREFERRED EMBODIMENTS

Figure 1:
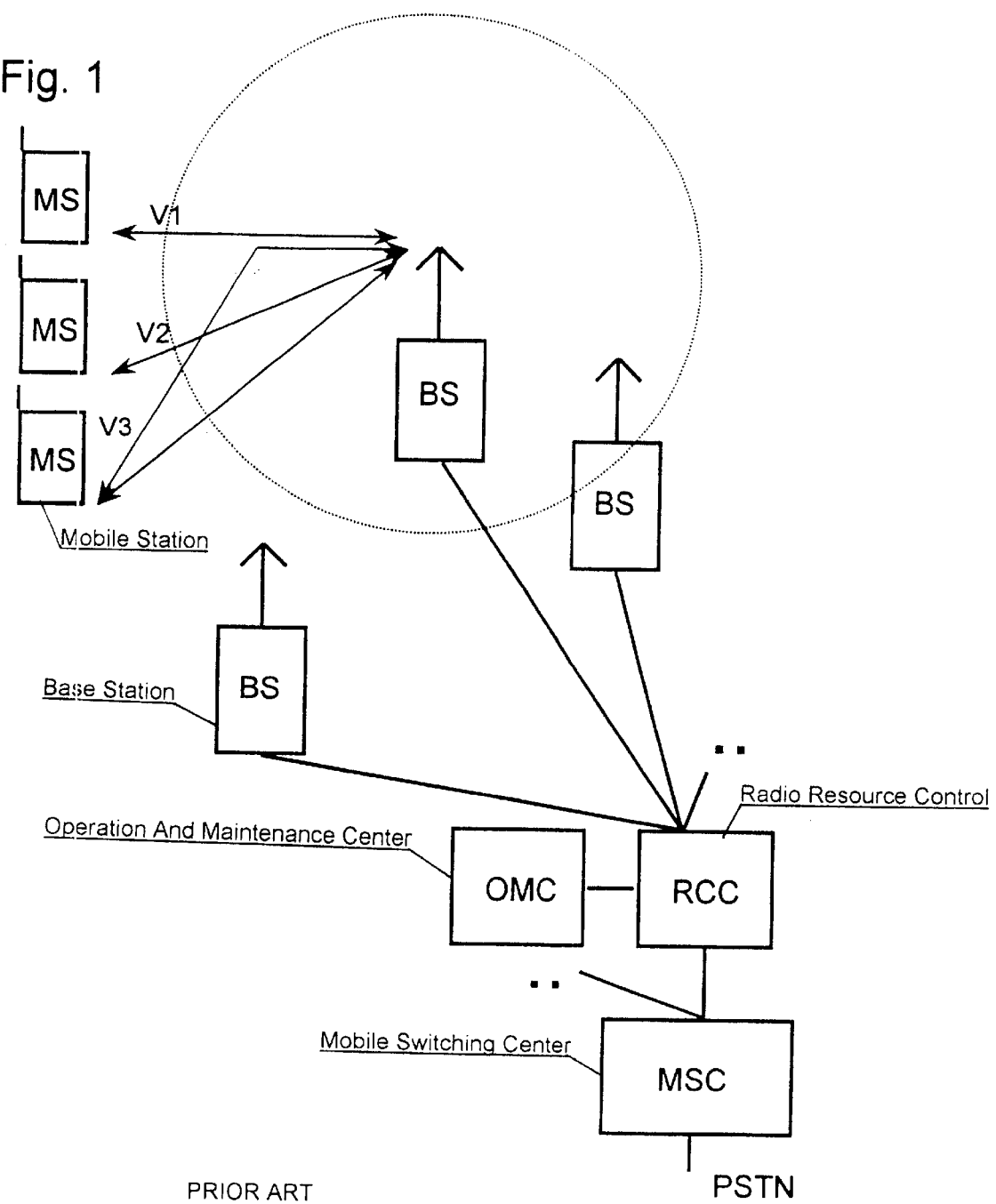
FIG. 1 is a schematic block diagram of a radio communications system.

Referring now to the figures of the drawings in detail and first, particularly, to FIG. 1 thereof, there is shown a mobile radio system as an example of a radio communications system. The mobile radio system illustrated in FIG. 1 includes a number of mobile switching centers MSC, which are networked to one another and provide access to a fixed network PSTN (public switched telephone network), respectively. Furthermore, these mobile switching centers MSC are connected to in each case at least one device RRC for controlling the base stations BS and for assigning or allocating radio resources, that is to say a radio resource manager. Each of these devices RRC in turn allows a connection to at least one base station BS. Such a base station BS may use a radio interface to set up a connection to a subscriber station, for example to mobile stations MS or to other mobile and stationary terminals. At least one radio cell is formed by each base station BS.

By way of example, FIG. 1 shows connections V1, V2, V3 for the transmission of data. An operation and maintenance center OMC provides monitoring and maintenance functions for the mobile radio system, or for parts of it. The functionality of this structure can be transferred to other radio communications systems in which the invention can be used, in particular for subscriber access networks with wireless subscriber access, and for base stations and subscriber stations operated in the unlicensed frequency range.

Figure 2:
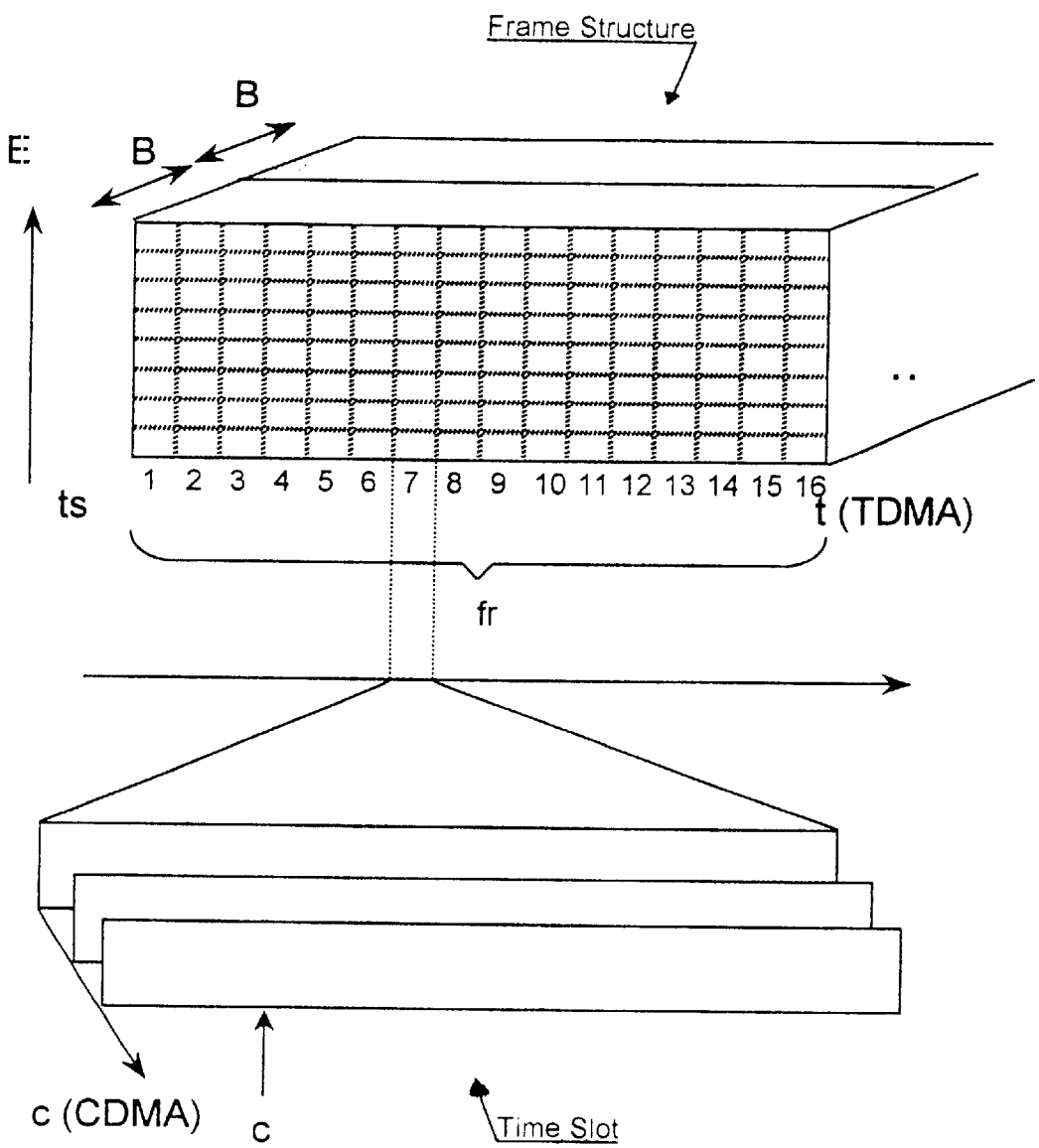
FIG. 2 is a schematic illustration of a TDD radio interface between a base station and subscriber station.

FIG. 2 illustrates the frame structure for a TDD (time division duplex) radio transmission. According to a TDMA (time division multiple access) component, a division into a plurality of time slots ts of equal time duration, for example 16 time slots ts 1 to 16 is carried out per frame fr within a broad band frequency range, for example with the band width B=5 MHz. Each base station BS1 to BS3 is allocated its own time slots ts. Some of the time slots ts are respectively used in the downlink direction DL, and some of the time slots are used in the uplink direction UL. A plurality of connections, indicated along an axis E, can be separated by a CDMA scheme.

In this TDD transmission method, the frequency band for the uplink direction UL corresponds to the frequency band for the downlink direction DL. The same is repeated for further carrier frequencies. The variable allocation of the time slots ts for the uplink direction UL or downlink direction DL allows versatile asymmetric resource allocations and the arbitrary allocation of the time slots ts to the base stations BS1 to BS3 allows a load-dependent adaption of the radio resources assigned to a base station BS.

The time slots ts are allocated in the device for allocating radio resources RRC, such that one time slot ts is allocated to just one base station BS1 to BS3. The time slots ts allocated to a base station BS1 are signaled to this base station BS1 by the device RRC. The first base station BS1 can determine in a number of ways which time slots ts are being used by the other base stations BS2, BS3, and in which transmission direction UL, DL.

1st method:

The first base station BS is signaled not only the allocation relating to the first base station, but is signaled the allocation and use of each individual time slot ts in the frame (and additionally the spread codes c which are used). Thus there is a signaling procedure for the entire allocation.

2nd method:

The base stations BS signal between themselves which time slots ts they are using and whether this is in the uplink direction UL or the downlink direction DL. The use of time slots ts is normally signaled to the mobile stations MS in a FACH (forward link access) channel (point-to-multipoint connection) via the radio interface in the downlink direction DL, in order to inform the mobile stations that a data transfer is taking place, and what type of data transfer this is. The information transmitted in the FACH channel also contains details about which resources of a base station BS have been allocated when, for how long, and to which mobile station MS. According to the second method, this information is also evaluated by the other base stations BS.

3rd method:

Each base station BS uses a monitoring procedure to determine in which transmission direction the other time slots ts, which are not allocated to it, are used and to determine which base stations BS use those other time slots ts, which are not allocated to it. For this purpose, the base station BS receives in all the time slots ts which are not allocated to it, and uses the received information to reconstruct the allocation.

The above-described methods may be combined and such a combination is within the scope of the invention.

Within the time slots ts, information for a plurality of connections is transmitted in radio blocks. The data are spread in a connection-specific manner with a fine structure, a spread code c, so that, for example, n connections can be separated by this CDMA component (code division multiple access) at the receiving end.

Figure 3:
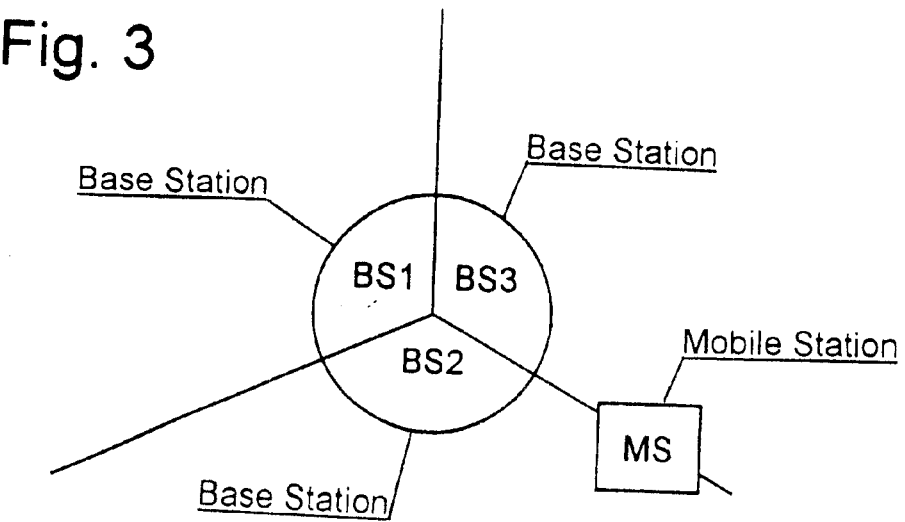
FIGS. 3 and 4 are schematic illustrations of different base station configurations.
Figure 4:
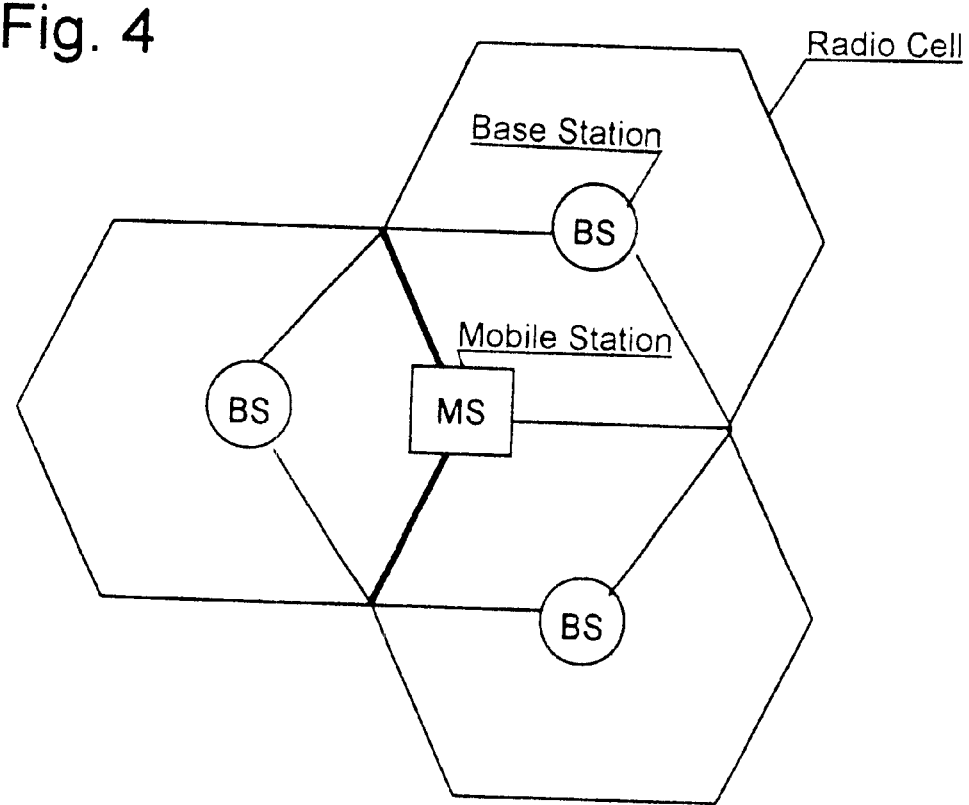

The three base stations BS1 to BS3 are either accommodated at the same location and supply different sectors, FIG. 3, or are installed at different locations, FIG. 4. In both cases, the diagrams of the radio beams of the base stations BS overlap at least partially in their coverage areas.

Figure 5:
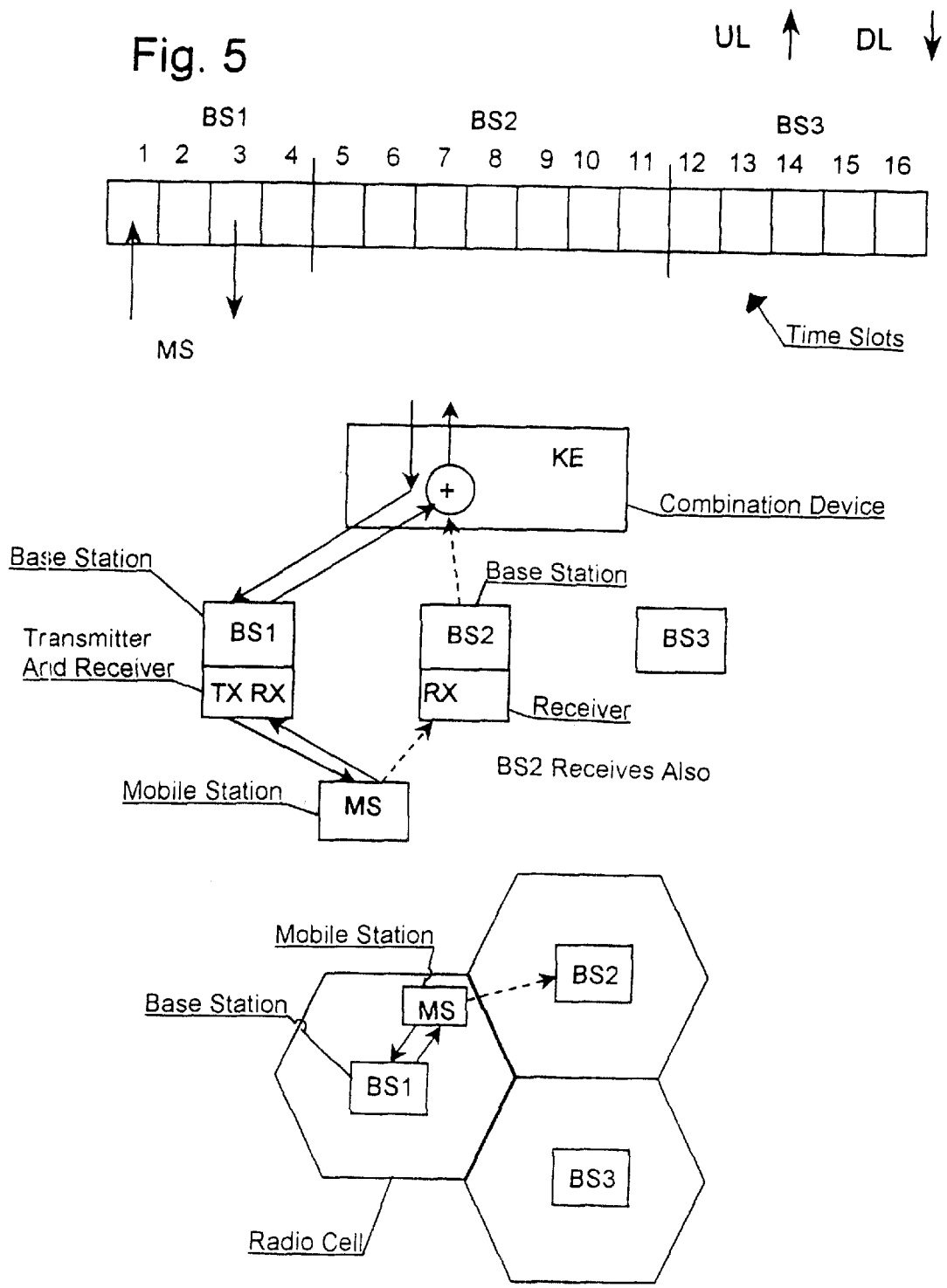

FIG. 5 shows a situation in which a first base station BS1 is allocated the first four time slots 1–4, a second base station BS2 is allocated the time slots 5–11, and a third base station BS3 is allocated the time slots 12–16. A mobile station MS is located in the radio cell of the first base station BS1 and is using the first time slot 1 for the uplink direction UL, and the time slot 3 for the downlink direction DL. The spread codes c will not be considered in the following.

The receiving device RX in the first base station BS1 thus receives, in the first time slot 1, the signals transmitted by the mobile station MS, and a transmitting device TX in the first base station BS1 transmits to the mobile station MS in the third time slot 3. A receiving device RX in the second base station BS2, which is a base station that is adjacent to the first base station BS1, additionally receives the signals from the mobile station MS in the first time slot 1, even though this time slot 1 is not allocated to the second base station BS2. The received signals at the two base stations BS1, BS2 can thus be combined with one another. This is done in a combination device KE. Either an MRC (maximum ratio combining) combination for the data in the physical layer or a selective combination of RLC (radio link control) data frames is used for the combination. Details relating to the combination of two received signals can be found in the European patent document EP 96 114 902.

If a handover to an adjacent base station BS2 is necessary as a result of a movement of the mobile station MS, then, in contrast to W-CDMA (wideband code division multiple access), this is a hard handover, since the mobile station MS is allocated new time slots ts 6 and 8 (see FIG. 6). The second base station BS2 cannot retain the time slots 1 and 3, but has to use the time slots 5–11 allocated to it, in order to supply the mobile station MS. If the reception conditions allow a reception, however, the macrodiversity reception is continued and the first base station BS1 also receives in the time slot 8, which is actually allocated to the second base station BS2.

Since, according to FIG. 2, not only the signals of a mobile station MS but signals (separated by spread code c) of a plurality of mobile stations MS are transmitted in a time slot ts, a base station BS receives a signal mixture. With regard to synchronized timing and reception power, this signal mixture is optimized for the base station BS1 which is supplying the mobile station MS. Which of the received signals are used for a combination in the second base station BS2 depends on the connection-specific transmission conditions. A received signal whose power level is too low at that location or a received signal whose synchronization to the further base station BS2 is inadequate cannot be used for a macrodiversity reception. The macrodiversity reception is thus connection-specific.

The decision as to when the macrodiversity reception is started or ended for a mobile station MS depends on quality parameters, which are determined continuously. If the contribution of the respective additional base station BS2, BS1 to the improvement in the reception quality is insignificant, or even counter productive, then the combination process is stopped. Depending on whether the combination device KE is or is not disposed at one location with the two base stations BS1, BS2 involved in the macrodiversity reception, an additional transmission capacity may be required in the connection of the base stations BS to other network elements. This also influences the decision as to whether to switch the macrodiversity on or off. If the additional effort is high, then the macrodiversity reception is used only for a very poor reception quality or if the transmission resources between the base stations BS are adequate.

Nevertheless, the adjustment of the transmission power of the mobile station MS during the macrodiversity reception is carried out only on the basis of the evaluation by a base station BS1 or BS2. The fact that a multiple reception is performed is irrelevant.

I claim:

1. A method for transmitting data via a radio interface between base stations and subscriber stations in a radio communications system, the method which comprises:

using a time-division multiplex process for organizing a radio interface within a frequency band such that a plurality of time slots constitute a frame;

selectively using the time slots in one of an uplink direction and a downlink direction;

allocating respective time slots of the plurality of time slots in the frame to respective base stations;

transmitting, with the respective base stations, using exclusively the respective time slots allocated to the respective base stations for the downlink direction;

receiving, with the respective base stations, in the respective time slots allocated to the respective base stations for the uplink direction as well as in further ones of the time slots not allocated to the respective base stations for the uplink direction; and combining received signals from at least two of the base stations for a macrodiversity reception.

2. The method according to claim 1, which comprises using respective monitoring procedures in the respective base stations for determining time slots in the uplink direction not allocated to the respective base stations.

3. The method according to claim 1, which comprises reporting, from a central unit to the respective base stations, the time slots not allocated to the respective base stations in the uplink direction.

4. The method according to claim 1, wherein the respective base stations report among each other the time slots in the uplink direction not allocated to the respective base stations.

5. The method according to claim 1, which comprises:

providing the respective base stations as base stations for different sector cells; and installing the base stations for the different sector cells at one location.

6. The method according to claim 1, which comprises:

providing the respective base stations as base stations for different sector cells; and installing the base stations for the different sector cells at different locations.

7. The method according to claim 1, which comprises:

using a frequency band having a broad band width for the transmitting step; and distinguishing signals transmitted at the same time within the frequency band on the basis of a connection-specific spread code.

8. The method according to claim 1, wherein the combining step includes a maximum ratio combination.

9. The method according to claim 1, wherein the combining step includes a selective combination.

10. A radio communications system, comprising:

a first base station and a second base station, said first and second base stations having a radio interface for transmitting data in a downlink direction and for receiving data in an uplink direction;

a radio resource controller connected to said first and second base stations for allocating radio resources and organizing said radio interface within a frequency band in accordance with a time-division multiplex scheme such that a plurality of time slots constitute a frame, each of said time slots being exclusively used in one of the uplink direction and the downlink direction;

said first base station having a transmitter transmitting in a given one of the time slots allocated to said first base station for the downlink direction;

said first base station having a first receiver for receiving in a further one of the time slots allocated to said first base station for the uplink direction;

said second base station having a second receiver receiving in another one of the time slot allocated to said second base station for the uplink direction and receiving in additional ones of the time slots not allocated to said second base station for the uplink direction; and a combination device connected to said first and second base stations and combining received signals from said first and second base stations for a macrodiversity reception.

11. A radio communications system according to claim 10, wherein said first receiver also receives in time slots not allocated to said first base station for the uplink direction.

12. A radio communications system according to claim 10, including a subscriber station receiving in the given one of the time slots allocated to said first base station for the downlink direction and transmitting in the further one of the time slots allocated to said first base station for the uplink direction.

* * * * *